United States Patent [19]
Czernik et al.

[11] 3,924,907
[45] Dec. 9, 1975

[54] BEARING PAD AND BRIDGE CONSTRUCTION

[75] Inventors: Daniel E. Czernik, Hinsdale; Donald J. McDowell, Riverside, both of Ill.

[73] Assignee: Felt Products Mfg. Co., Skokie, Ill.

[22] Filed: Oct. 29, 1974

[21] Appl. No.: 518,594

[52] U.S. Cl. .................. 308/3 R; 14/16 B; 248/22
[51] Int. Cl.² ........................................ F16C 29/02
[58] Field of Search ............. 308/3 R, 3.5; 14/16 B; 248/22

[56] References Cited
UNITED STATES PATENTS

| | | | |
|---|---|---|---|
| 3,484,882 | 12/1969 | Blanchette | 14/16 B |
| 3,544,176 | 12/1970 | Slater | 308/3 R |
| 3,544,415 | 12/1970 | Price et al. | 248/22 X |
| 3,782,788 | 1/1974 | Koester et al. | 14/16 B X |

Primary Examiner—M. Henson Wood, Jr.
Assistant Examiner—Michael Mar
Attorney, Agent, or Firm—Dressler, Goldsmith, Clement & Gordon, Ltd.

[57] ABSTRACT

A bridge bearing pad assembly to be positioned between a bridge member and a bridge support. The bearing pad assembly comprises a slide plate assembly and a bearing pad. The bearing pad includes a main body portion at least one inch thick of an elastomer having a durometer of from about 40 to 65. An intermediate layer of an elastomer of from about 1/16 to ¼ inch and having a durometer of from about 80 to 100 overlies the main body portion. Stiffening shims are embedded in the main body portion and one lies at its upper surface and directly below the intermediate layer. A thin layer of Teflon overlies the intermediate layer. All of the layers are preferably vulcanized to each other. The slide plate assembly provides a stainless steel slide plate larger than the confronting bearing pad slide surface to slide against the Teflon and to cover it throughout the entire design range of relative movement.

18 Claims, 5 Drawing Figures

BEARING PAD AND BRIDGE CONSTRUCTION

This invention relates to an improved elastomeric bearing pad of a type especially adapted to be used in a bridge construction to allow movement between a load carrying member of a bridge and a bridge support structure.

A wide variety of bearing constructions have been developed and used to accommodate relative movement of load carrying members of a bridge with respect to bridge support or pier structures. The most severe movement which must be accommodated is that resulting from changes in ambient temperature. Unless the relative movement is accommodated, the load carrying member will stress the support structure unduly, thereby causing failure of the bridge.

For many years, it has been common practice to install various types of mechanical devices between the load carrying member and the bridge support member. The most common of these devices are roller and rocker bearings, a typical one of which is disclosed in McKeown, U.S. Pat. No. 1,781,517.

Roller and rocker bearings have a number of disadvantages. For example, the seats tend to become clogged with roadway dirt and the seats and rockers or rollers tend to corrode. As a result, they sometimes freeze or otherwise fail to act as they were designed, thereby causing bridge failure. Additionally, certain types of rocker bearings must be installed at the anticipated mean temperature, or they must be angled or leaned in accordance with the temperature of installation in order to function properly. If there is an error in this regard, the bearings sometimes fail. Further, it has been found that after many years of service, many rollers or rockers tend to work their way out of position, sometimes for unknown reasons. As that occurs, they frequently begin to lean increasingly in one direction and sometimes fail to right themselves at mean temperatures contributing to their ultimate failure and damage to the bridge.

More recently, elastomeric bearing pads have been introduced and are being used with increasing frequency. Elastomeric bearing pads more readily adapt to movement of the load carrying member, whether as a result of temperature change or as a result of varying traffic loads. Elastomeric bearing pads are unaffected by corrosion and contaminants. Further, complexity of movement of the load carrying member with respect to the bridge support is inconsequential as the elastomeric bearing pad is free to lean and tilt and to move in shear as well, thereby to adapt to complex movements without difficulty.

However, elastomeric bearing pads must permit relative travel between the load carrying member and the support structure of a bridge. This is usually provided for by utilizing a sufficient thickness of elastomer to accommodate the anticipated travel. An elastomeric bearing pad will move in shear without destruction up to a predetermined amount, depending upon the nature of the elastomer. Accordingly, once the expected travel or movement of the load carrying member relative to the bridge support is known, the thickness of the bearing pad may be calculated to accommodate that movement.

That movement may be accommodated by using a single thickness of elastomer or additional shear movement may be provided for by introducing one or more shims into the elastomeric bearing pad in a manner and according to design characteristics known to those skilled in the art. It is also necessary, however, to take into consideration the temperature of installation in arriving at the desired thickness of the bearing pad. Depending upon the temperature of installation and its variance from the mean temperature, the thicker the rubber bearing will have to be if it is to accommodate shear throughout the entire design temperature range. However, rubber thickness is limited by a number of design factors including space limitations and stability considerations. For example, rubber thickness should not be any greater than one-third of any plan dimension of the bearing pad.

In many bridge environments it is difficult to install an elastomeric bearing pad having a thickness adequate to accommodate the necessary travel of the load carrying member. For this reason, and also to permit sliding movement of the load carrying member relative to the bridge support, efforts have been made to design bridge bearing pad assemblies which provide confronting surfaces which will slide with respect to each other, as rollers have moved relative to support structures previously. To that end, a number of suggestions have been made regarding the use of a polytetrafluoroethylene surface confronting a complementary slide surface, such as a stainless steel surface, thereby to permit a load carrying member to slide with respect to the support structure of a bridge. Design criteria relative to the use of polytetrafluoroethylene are described in Meeting Preprint 853, Bearing Pads of "Teflon", William H. Holstein, Jr., ASCE Annual Meeting, Louisville, Kentucky, Apr. 14–18, 1969. "Teflon" is the trademark of DuPont for its brand of polytetrafluoroethylene materials, which materials, for convenience, shall be referred to as Teflon herein. Typical constructions using Teflon surfaces are those illustrated in U.S. Pat. Nos. 3,301,609, 3,243,236, 3,349,418, 3,397,856 and 3,484,882. In yet another such construction, a molded laminated neoprene pad is provided with a layer of Teflon vulcanized to its top surface. That pad underlies a polished stainless steel plate secured to a load carrying member, thereby to permit the load carrying member to slide relative to the Teflon surface of the bearing pad.

The elastomeric bearing pad of this invention makes optimal use of the antifriction characteristics of Teflon in a bearing pad construction which uses a minimum amount of elastomer, i.e., one which is as thin as possible, and yet achieves all of the advantages of an elastomeric bearing. A typical bridge bearing pad assembly in accordance with this invention comprises a slide plate secured to a load carrying member and confronting and bearing against a bridge bearing pad. The bridge bearing pad comprises a main body portion of an elastomeric material having a durometer of from about 40 to about 65, and preferably from about 45 to 55 durometer, an intermediate layer of a relatively hard elastomer of a durometer of from about 80 to about 100, and preferably of from about 85 to 95 durometer, bonded to the top surface of the main body portion, and an upper layer of Teflon or filled Teflon bonded to the upper surface of the intermediate layer. The upper surface of the Teflon layer provides a smooth sliding surface in contact with the slide plate.

The elastomeric main body portion is laminated with at least one shim or stiffening plate lying intermediate the top and bottom surfaces of the main body portion, which shim, when there is only one, is positioned directly below the intermediate layer, cooperating with it to help it provide its support and limited cushioning functions. The shims otherwise function in the manner known to the art.

The intermediate layer tends to restrict the Teflon from being stressed in tension thereby helping to maintain the integrity of the Teflon layer. When Teflon has been bonded to the softer rubber of prior art bearing pads, under compression and under eccentric loading such as that caused by rotation of a bridge beam, the rubber tends to expand and flow laterally, severely stressing the bond between the Teflon and the rubber and also placing the Teflon under tension, frequently stretching it beyond its elastic limit, hence permanently deforming the Teflon layer and surface, entirely changing the characteristics designed for.

Furthermore the lateral flow of the rubber of the conventional softer rubber bearing pads tends to redistribute the loads supported by the bearing pad to a central area spaced inwardly of the edges of the pad. In other words, the unconfined peripheral area does not support its share of the load. This means that foreign particles may much more easily intrude into the peripheral area, thereby affecting the antifrictional characteristics of the Teflon. The intermediate layer of this invention helps more evenly to distribute the loads, thereby maintaining the peripheral area of the Teflon surface in firm engagement with the slide plate to help prevent the intrusion of grit and other particles, thereby maintaining the desired antifriction characteristics at the interface. Unlike steel surfaces to which Teflon has been bonded in some prior art bearing pads to prevent its stretching and destruction under loading, and to attempt to maintain uniform stress distribution, the intermediate layer provides a degree of compressibility serving to help maintain intimate contact between the Teflon surface and the slide surface throughout the entire contact area, and thereby more uniformly to distribute the stresses and loads applied to the bearing pad across the entire bearing pad than is possible with Teflon bonded to steel and other rigid, relatively incompressible surfaces.

These and other objects, features and advantages of this invention will become apparent from the following description and drawings, of which:

Figure 2:
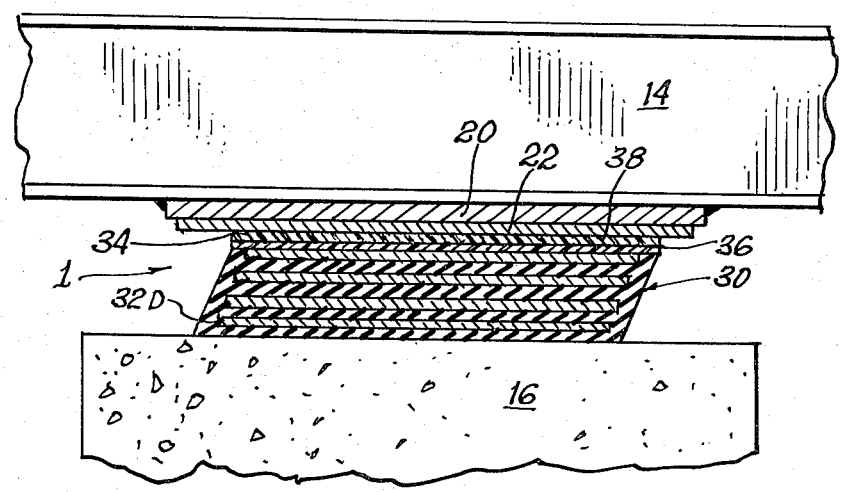
FIG. 2 is a side elevational view, partially in section, of a bridge construction employing a bridge bearing pad assembly of this invention.

Referring now to the drawings, a bridge bearing pad assembly 1 of this invention includes a slide plate assembly 10 and a bearing pad 12. The slide plate assembly 10 is adapted to be mounted and secured fast with a load carrying member, such as a bridge beam 14. The bearing pad 12 is adapted to be supported on and mounted to a bridge support, such as pier 16.

Slide plate assembly 10 may desirably comprise a mounting plate 20 which may be of cold rolled steel and a slide plate 22. Slide plate 22 is preferably of a highly polished stainless steel. Slide plate 22 may be secured to mounting plate 20 as by welding or may preferably be secured to the mounting plate by an elastomeric cushioning layer 24 which also acts adhesively to assist in securing the mounting plate and slide plate to each other. Elastomeric layer 24 will serve as a cushioning layer to allow slight localized relative vertical movement between the slide plate 22 and the mounting plate 20 to accommodate localized unequal stress conditions and thereby provides more uniform stress distribution of the interface of the Teflon and the stainless steel slide plate. The use of the elastomeric cushioning layer 24 also helps to maintain intimate contact between the slide plate and the bearing pad 12 throughout, and especially at its edges, thereby also to help exclude the entry of extraneous materials, such as grit particles, therebetween, helping to protect the antifrictional characteristics of the bearing assembly. Desirably layer 24 is from about 1/16 to about ¼ inch thick and preferably is from about 3/32 to about ⅛ inch thick. A preferred cushioning layer is of chloroprene vulcanized to plates 20 and 22.

Bearing pad 12 comprises an elastomeric main body portion 30 of rubber or of a synthetic rubber, such as chloroprene, urethane rubber or the like. In the preferred embodiment of this invention, the elastomeric material is 100% virgin chloroprene having a durometer of approximately 50 according to ASTM Hardness Specification D2240. The elastomeric main body portion embeds a plurality of expansive steel shims 32A to 32D or stiffening plates which are of rolled mild steel. The thickness and number of shims employed will depend upon the size of the bearing and upon the shear stress values to be designed for, and will take into consideration the range of movement of a bridge beam 14 with respect to a support 16. Typically shims 32A–D will run from about 3/32 to ¼ inch in thickness.

The main body portion 30 is preferably molded as a rectangular parallelopiped with generally rectangular, preferably solid shims 32A to 32D lying between and generally parallel to the upper and lower surfaces of the main body portion 30. The main body portion is desirably at least one inch thick. The top surface 34 of the main body portion is provided with a relatively hard intermediate layer 36 of a harder rubber, such as of 100% virgin chloroprene which, in a preferred embodiment, is of a durometer of about 90 according to ASTM Specification D2240. Its thickness may vary, but desirably its thickness is from about 1/16 to ¼ inch, and preferably from about ⅛ to 3/16 inch in thickness. Layers 36 significantly thicker will not suitably resist the stresses encountered in most bridge constructions and provide the advantages of the intermediate layer 36. Layers 36 significantly thinner will not provide the cushioning and other functions for which layer 36 is used. Layer 36 is secured to upper surface 34 as by vulcanizing it with the main body portion 30.

In most bridge environments, the intermediate layer 36 desirably lies directly against the uppermost shim 32A, although it may be spaced by softer rubber or the like from the shim by a distance of up to about fifty percent of the thickness of the intermediate layer 36, but preferably less. The interpositioning of any appreciable thickness of the lower durometer elastomer of the main body portion between shim 32A and layer 36 will tend adversely to affect the functioning of the intermediate layer, thereby defeating its functional advantages.

ble to make elastomeric pads thinner without affecting their functional characteristics while remaining within the design parameters set by a bridge engineer. The thinner the pad, the smaller also it can be in plan view. Ultimately it can also be less expensive because substantially less material is used. These advantages derive from the bearing pad of this invention which makes more effective and certain use of a polytetrafluoroethylene layer than has been the case with prior art bearing pads.

In designing a bridge bearing pad, many factors must be taken into consideration. Some of these have already been referred to. Yet another factor is the inclination of the roadway, for very frequently bridges have inclines or grades. In such cases bearings may be more heavily loaded at a leading than a trailing edge if the load carrying member inclines upwardly from the leading to the trailing edge. This incline can contribute to excessive compressive loading at one edge of the bearing. It may also contribute to uplift under traffic loads, i.e., the lifting up of a slide plate from contact with the bearing pad surface, as at the trailing edge of the bearing under either static or dynamic loads. That would permit contaminants and foreign material to work into the space between the slide surfaces which would then tend to impair their antifriction characteristics. Therefore, in designing a bearing assembly for a particular environment, it may be necessary to incline the upper surface of bearing pad 12 or to slope the slide plate assembly, as by tapering mounting plate 20, thereby more uniformly to distribute compressive loads and to prevent uplift. In the former case the shims 32 would not necessarily be parallel both to the upper and lower surfaces of the main body 30 of the bearing pad 12, but would be only approximately so.

Figure 4:
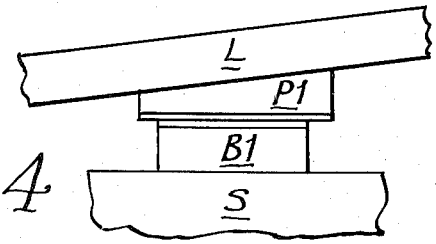
FIGS. 4 and 5 are fragmentary side elevational views of further environments in which bearing pad assemblies of this invention may be used.
Figure 5:
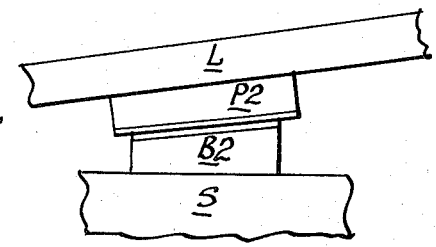

Typical sloping or inclined environments are illustrated in FIGS. 4 and 5 where load bearing members L and supports or piers S are shown. In FIG. 4 the slide plate assembly P1 has a slide plate surface which is generally horizontal and the bearing pad assembly B1 also provides a complementary, generally horizontal slide surface and the assembly B1 remains as generally a rectangular parallelepiped. In FIG. 5, the complementary slide surfaces of assemblies P2 and B2 are inclined at generally the same angle as is the load bearing member L. In that case at least some of the shims, especially the uppermost shim, should also be inclined and therefore it would not be exactly parallel both to the upper and lower surfaces of the main body portion of the bearing pad assembly.

Intermediate layer 36 makes it possible for elastomeric main body portion 30 and Teflon layer 38 to function as they are intended to function. Layer 36 provides a cushioning effect thereby to enhance uniformity of stress and load distribution across the entire bearing and to enhance conformability of, and to maintain contact between the confronting slide surfaces. Intermediate layer 36 acts as a bridge between the main body and the antifriction layer and provides both structural strength limiting tensioning of the Teflon and the ability locally to deform as may be necessary. It also discourages the working of foreign matter into the polytetrafluoroethylene layer by tending to maintain full surface contact between the Teflon layer surface and the slide surface. Further, it tends to enhance the uniformity of load distribution under loading by bridge beam 14 upon the main body portion 30 and upon the Teflon layer. It serves to help maintain the integrity of the Teflon layer, thereby to prevent its destruction and what would be the consequential increase in frictional drag and possible impairment of the bearing pad altogether. Of course, the main body portion 30 moves in shear and accommodates rocking and rolling movements as do elastomeric bearing pads known to the prior art.

It will be clear from the foregoing specification and drawings that modifications may be made without departing from the spirit and scope of this invention. Accordingly, the invention disclosed herein is intended to be limited only as may be required by the claims.

We claim:

1. A bearing pad for supporting the weight of a load bearing member upon a support structure and for compensating for and accommodating movement of a load bearing member relative to a support structure and being adapted to confront and bear against a slide plate surface, said bearing pad comprising a main body portion, an intermediate layer and a polytetrafluoroethylene layer, said main body portion comprising an elastomeric material having a durometer of from about 40 to about 65 and being adapted to be supported between a said load bearing member and a said support structure, said main body portion having an upper and a lower surface and at least one expansive shim plate lying between said upper and lower surfaces and immediately underlying said intermediate layer, said intermediate layer comprising a non-metallic compressible material which is substantially less compressible than said elastomeric material and which has a greater tension limiting strength under compressive loading than does the upper portion of said elastomeric material, thereby to restrict tensioning of the polytetrafluoroethylene when the bearing pad is compressively loaded, said intermediate layer being bonded to the upper surface of said main body portion in close proximity to the uppermost expansive shim plate, said layer of polytetrafluoroethylene being bonded to the upper surface of said intermediate layer and providing an upper slide surface adapted slidably to engage a confronting slide plate surface for slidably accommodating movement of a said load bearing member relative to a said support structure.

2. A bearing pad in accordance with claim 1 in which said intermediate layer is one of a relatively hard elastomer having a durometer of from about 80 to about 100, leather, rubber bonded asbestos sheet material and a non-rigid flexible epoxy material.

3. A bearing pad in accordance with claim 1 in which said intermediate layer is a relatively hard elastomer having a durometer of from about 80 to about 100 durometer.

4. A bearing pad in accordance with claim 3 in which the durometer of said intermediate layer is from about 85 to 95 durometer.

5. A bearing pad in accordance with claim 1 in which said main body portion is at least 1 inch thick, said shim plate is from about 3/32 to about ¼ inch thick, said intermediate layer is from about 1/16 to about ¼ inch thick and said polytetrafluoroethylene is a Teflon sheet which is at least about 1/16 inch thick.

6. A bearing pad in accordance with claim 5 in which said intermediate layer is an elastomer having a durometer of from about 85 to about 95, and in which said intermediate layer is spaced from a shim plate by a distance of no more than a distance of up to about fifty percent of the thickness of the intermediate layer.

An upper layer 38 of a fluorinated hydrocarbon polymeric material is provided on the uppermost surface of the hard rubber layer 36. In the preferred embodiment, the upper layer is polytetrafluoroethylene and is a sheet approximately 1/16 inch in thickness which is of 100% virgin Teflon material meeting the requirements of ASTM D1457-69. The material is formed by molding it under heat and pressure, following which it is skived into a 1/16 inch thickness sheet. Its Shore D hardness at 78°F. is from about 50 to 65. The Teflon layer is preferably bonded to the upper rubber layer 36 during vulcanization and may be suitably pre-etched to promote and enhance the bond between it and the intermediate layer.

The use of the harder intermediate layer 36 improves the long-term integrity of the bond and assists in the bonding of the polytetrafluoroethylene to the main body portion during vulcanization. That bond also tends to be somewhat more flexible than a steel to Teflon bond would be which is of advantage bothwhen the bearing is stressed under traffic loading and as a result of temperature changes.

Other suitable polytetrafluoroethylene materials comprise filled Teflon compositions, such as those incorporating molybdenum disulfide or graphite or reinforcing agents, such as glass fibers, and fabrics, such as woven or non-woven fabrics. Teflon fabrics form voids which are adapted to receive grit particles which do intrude and therefore sometimes tend to retain their antifriction characteristics even better than do Teflon sheets in bridge environments.

Although we have determined an intermediate layer of a relatively hard elastomer of from about 80 to about 100 durometer serves to provide the substantial advantages described herein, there are other non-metallic materials which may also serve to act as does that elastomer in restricting tensioning of the Teflon layer while functioning to maintain intimate contact at the interface of the Teflon and the slide plate and while serving to help distribute the load evenly across the entire bearing pad to help prevent the intrusion of foreign particles at the peripheral edge of the pad and to permit localized compression of the bearing pad. Typical of such other materials are a non-rigid, flexible epoxy, with or without fabric reinforcement, such as a glass fiber fabric reinforcement, leather and rubber bonded asbestos sheet. Such materials may be bonded in the bearing pad with suitable adhesive. All of these will limit lateral tensioning of the Teflon and all of these are compressible and provide a degree of recovery when compressive loading is relaxed. Like the higher durometer elastomer, all of these materials are non-metallic and are compressible, but substantially less compressible than the lower durometer elastomer, and have a higher tension limiting strength than does the upper portion of the lower durometer elastomer under compressive loading, thereby to restrict tensioning of the Teflon when the bearing pad is compressively loaded.

Bridge bearing pad assembly 1 is adapted to be installed between a load carrying member such as a bridge beam 14 and a bridge support such as a pier support 16. Because of the characteristics of the bridge bearing pad assembly of this invention, it may be installed at any temperature without prestressing, leaning or other of the manipulative steps required with many prior art bearing constructions. It may be installed as illustrated, but could also be installed upside down, if desired, although this is not as desirable because of the problems of the possible intrusion of foreign materials, grit and the like. Accordingly, references to upper and lower surfaces herein are for convenience of description only.

FIG. 2 shows a bridge bearing assembly 1 of this invention installed and under load. It illustrates the bearing pad as having moved, under the influence of loading, in shear. As the shear stresses increase, rather than continuing to deform in shear, the frictional resistance against movement of the slide plate 22 relative to the Teflon layer 38 will be overcome and the plate 22 and bridge beam 14 will slide relative to bearing pad 12 and pier support 16. It should be noted that slide plate 22 is long enough and wide enough so that regardless of the temperature of installation and of the range of movement, it will always completely cover and remain in contact with all of layer 38.

The fact that sliding will take place makes it unnecessary to prestress the bearing pad, such as within the mean anticipated temperature range at the time of installation. That means that the bearing pad may be installed at any temperature with no concern for its possible failure due to movement of a bridge beam with respect to a bridge support, within, of course, design limits. It also means that movement will occur before excessive shear stresses damage the main body portion 30, providing a safety factor for the overall construction and making it possible to use a thinner main body portion and a thinner overall bearing pad 12. Elastomeric bearing pads having elastomeric body portions at least 1 inch thick, with intermediate and Teflon layers of the thicknesses set forth above are preferred. Of course, the main body portion may be as much as 5 inches thick or more.

A typical bearing pad made in accordance with this invention comprised a main body portion 12 × 12 × 2½ inches and of 55 durometer chloroprene. The intermediate layer was ⅛ inch thick, was of 90 durometer chloroprene and was within 1/16 inch of the uppermost shim 32A. The polytetrafluoroethylene was a sheet 1/16 inch thick. The main body portion embedded four steel shim plates 11¾ × 11¾ × ⅛ inch which were substantially unexposed at the side edges of the bearing pad. The entire assembly was vulcanized.

When a highly polished stainless steel slide plate was urged down against the Teflon layer under a compressive stress of 500 psi and was moved laterally, the main body portion moved in shear (as illustrated by FIG. 2) a distance less than the limit designed for, i.e. less than 20% of the effective rubber thickness (ERT) of the main body portion, because frictional resistance was overcome before that limit was reached.

Figure 1:
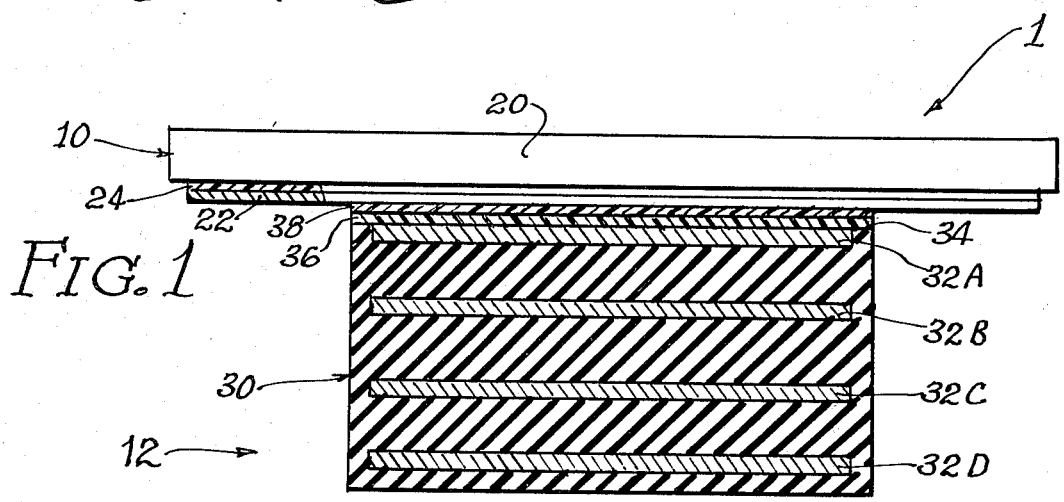
FIG. 1 is a side elevational view, partially in section, of a bridge bearing pad assembly of this invention, taken substantially along line 1—1 of FIG. 3.
Figure 3:
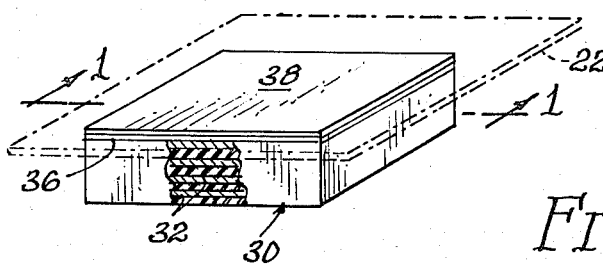
FIG. 3 is a fragmentary perspective view, partially broken away, of the bearing pad assembly of FIGS. 1 and 2.

When the frictional resistance between the Teflon and stainless steel was overcome, the Teflon and the main body portion moved from its shear stressed position as typified by FIG. 2 towards the relaxed position of FIG. 1.

If movement were to continue in the same direction, the main body portion would again become stressed in shear, until frictional resistance was again overcome and the main body portion would return toward the relaxed position of FIG. 1. It is this action that permits installation of the bearing pad assembly at any temperature within the design range without concern for correcting for the deviation from the mean temperature as long as the slide plate is of adequate size. Of course, because the shear stresses will be relieved before the maximum shear designed for is reached, it becomes possi- 7. A bearing pad in accordance with claim 6 in which said elastomeric material has a durometer of from about 45 to about 55.

8. A bridge construction comprising a fixed bridge support member and a load carrying bridge member mounted for movement relative to said fixed member, a bearing pad assembly positioned between said members to compensate for and to accommodate relative movement therebetween, said bearing pad assembly comprising a bearing pad secured to one of said members and a slide plate secured to the other of said members and confronting said bearing pad, said bearing pad comprising a main body portion, an intermediate layer and a polytetrafluoroethylene layer, said main body portion comprising an elastomeric material having a durometer of from about 40 to about 65 durometer, said main body portion having an upper and a lower surface and at least one expansive shim plate lying between said upper and lower surfaces and immediately underlying said intermediate layer, said intermediate layer being bonded to said main body portion and comprising a non-metallic compressible material which is substantially less compressible than said elastomeric material and which has a greater tension limiting strength under compressive loading than does the upper portion of said elastomeric material, thereby to restrict tensioning of the polytetrafluoroethylene when the bearing pad is compressively loaded and to provide for uniform load distribution under loading by the load carrying bridge member, an upper layer of polytetrafluoroethylene bonded to the upper surface of said intermediate layer and providing an upper slide surface adapted to slidably confront and engage said slide plate for compensating for and accommodating movement of said load carrying bridge member relative to said bridge support member.

9. A bridge construction in accordance with claim 8 in which said intermediate layer is one of a relatively hard elastomer having a durometer of from about 80 to about 100, leather, rubber bonded asbestos sheet material and a non-rigid flexible epoxy material.

10. A bridge construction in accordance with claim 8 in which said intermediate layer is of a relatively hard elastomer having a durometer of from about 80 to 100.

11. A bridge construction in accordance with claim 8 in which said slide plate is highly polished stainless steel and is secured to said load carrying member.

12. A bridge construction in accordance with claim 11 in which said slide plate is bonded to an intermediate elastomeric cushioning layer which in turn is secured to said load carrying member.

13. A bridge construction in accordance with claim 12 in which said intermediate cushioning layer is bonded to a mounting plate which is secured to said load carrying member.

14. A bridge construction in accordance with claim 10 in which said main body portion is at least one inch thick, said shim plate is from about 3/32 to about ¼ inch thick, said intermediate layer is from about 1/16 to about ¼ inch thick and said polytetrafluoroethylene is a Teflon sheet which is at least about 1/16 inch thick.

15. A bridge construction in accordance with claim 14 in which said intermediate layer is an elastomer having a durometer of from about 85 to about 95, and in which said intermediate layer is spaced from a shim plate by a distance of no more than a distance of up to about fifty percent of the thickness of the intermediate layer.

16. A bridge construction in accordance with claim 15 in which said elastomeric material has a durometer of from about 45 to about 55.

17. A bridge construction in accordance with claim 15 in which said bearing pad is secured to said fixed bridge support and said slide plate is secured to said load carrying bridge member.

18. A bridge construction in accordance with claim 17 in which said slide plate is highly polished stainless steel and is bonded to an intermediate cushioning layer which in turn is secured to said load carrying member.

* * * * *